United States Patent
Mishra

(10) Patent No.: US 9,977,568 B2
(45) Date of Patent: May 22, 2018

(54) METHOD AND DEVICE FOR OPTIMIZING ARRANGEMENT OF AN ICON ON DISPLAY UNIT OF DEVICE

(71) Applicant: Wipro Limited, Bangalore (IN)

(72) Inventor: Bibhunanda Mishra, Dwarka (IN)

(73) Assignee: Wipro Limited, Bangalore (IN)

(*) Notice: Subject to any disclaimer, the term of this patent is extended or adjusted under 35 U.S.C. 154(b) by 337 days.

(21) Appl. No.: 14/741,522

(22) Filed: Jun. 17, 2015

(65) Prior Publication Data

US 2016/0253071 A1    Sep. 1, 2016

(30) Foreign Application Priority Data

Feb. 27, 2015 (IN) .............................. 956/CHE/2015

(51) Int. Cl.
| | | |
|---|---|---|
| *G06F 3/048* | (2013.01) | |
| *G06F 3/0481* | (2013.01) | |
| *G06F 3/0482* | (2013.01) | |
| *G06F 7/08* | (2006.01) | |

(52) U.S. Cl.
CPC ........ *G06F 3/04817* (2013.01); *G06F 3/0482* (2013.01); *G06F 7/08* (2013.01)

(58) Field of Classification Search
CPC .................................................. G06F 3/0482
USPC ....................................................... 715/811
See application file for complete search history.

(56) References Cited

U.S. PATENT DOCUMENTS

| 8,464,180 B1* | 6/2013 | Kirkham ........... H04M 1/72586 715/765 |
| 8,767,012 B2* | 7/2014 | Gilger .................... G06Q 10/00 345/440 |
| 9,374,431 B2* | 6/2016 | Kannan ................... H04L 67/22 |
| 2011/0040760 A1* | 2/2011 | Fleischman ............ G06Q 30/02 707/737 |
| 2013/0152001 A1* | 6/2013 | Lovitt ................... G06F 9/4443 715/765 |
| 2013/0178962 A1* | 7/2013 | DiMaria ........... G06F 17/30038 700/94 |
| 2014/0149932 A1* | 5/2014 | Wilder ................ G06F 3/04886 715/810 |
| 2015/0213547 A1* | 7/2015 | Gomez-Rosado .. G06F 3/04817 705/27.2 |
| 2015/0248214 A1* | 9/2015 | Gilger ................. G06F 3/04842 715/719 |
| 2016/0378302 A1* | 12/2016 | Gilger ................. G06F 3/04817 715/736 |
| 2017/0169361 A1* | 6/2017 | Gomez-Rosado .. G06F 3/04817 |
| 2018/0059906 A1* | 3/2018 | Gomez-Rosado .. G06F 3/04817 |

* cited by examiner

*Primary Examiner* — William Titcomb
(74) *Attorney, Agent, or Firm* — LeClairRyan PLLC

(57) ABSTRACT

Embodiments of the present disclosure disclose a method, non-transitory computer readable medium and computing device for optimizing arrangement of an icon on a display unit of a device. The method comprises determining a cumulative position score of each of plurality of grids on the display unit. The method further comprises determining a cumulative acquaintance score of the icon on the display unit. The method further comprises deriving a compatibility score between each of the plurality of grids and the icon based on the cumulative position score and the cumulative acquaintance score. The method further comprises optimizing the arrangement of the icon on the display unit based on the compatibility score.

21 Claims, 7 Drawing Sheets ise, digital cameras, and e-book readers (e.g., Kindles
METHOD AND DEVICE FOR OPTIMIZING ARRANGEMENT OF AN ICON ON DISPLAY UNIT OF DEVICE This application claims the benefit of Indian Patent Application No. 956/CHE/2015 filed Feb. 27, 2015, which is hereby incorporated by reference in its entirety.

TECHNICAL FIELD

The present subject matter is related, in general to a display unit of a device and more particularly, but not exclusively to a method and device for optimizing arrangement of an icon on the display unit of the device.

BACKGROUND

One or more device includes, without limitations, mobiles phones, Personal Computers (PC), laptop, desktop computer, tablet, smartwatch, cameras, notebook, pager, cellular devices, Personal Digital Assistant (PDA), Global Positioning System (GPS) receivers, Television (TV) remote controls, audio- and video-file players (e.g., MP3 players and iPODs), digital cameras, and e-book readers (e.g., Kindles and Nooks), smartphone, wearable device and the like. The one or more devices include a touch screen device having a touch screen panel. In general, each device comprises a display unit which may contain one or more icons. For example, the one or more icons can be Internet Explorer (IE), recycle bin, gaming icons, message icon, application icons, video icon, camera icon, gallery icon, document icons like word document, power point presentation, etc. Each icon is placed/arranged grid-wise on the display unit of the device.

Usually, the placement of each icon on the display unit is familiar to a user. Particularly, the familiarity of the icon on the display unit depends on cognitive skills. The user uses the cognitive skills to access and interact with the one or more icons on the display unit. The cognitive skills include sight associated with a symbol of the icon, color of the icon, and muscle memory that is associated with habit of the user of usage of the icon, position of the icon and structure of the icon. One of the examples of muscle memory is QWERTY keyboard. The placement or arrangement of the keys in the QWERTY keyboard is in such a manner that the user may able to type without looking at the keys. Currently, the position of the one or more icons is managed based on factors including, without limitation, name of the icon, date on which the icon is added on the display unit, size of the icon, type of the icon, priority set for the icon, usage of the icon, etc.

However, in the current approach, a problem arises when the position of the one or more icons is disturbed or changed when an action is carried out. The action includes, without limitation, addition of a new icon on the display unit, deletion of an icon from the display unit, change of the position of the icon on the display unit as per the user needs and/or change of background of the display unit i.e. addition or deletion of user interface of the display unit. In such a case, the rearrangement of the icon on the display unit may result in out-of-sight of the icon and/or the misplacement of the icon from an older position on the display unit. Therefore, the user needs to keenly look for the icon all over the display unit due to rearrangement of the icon. Due to such rearrangement of the icon from the familiarity location, the user may end up in selecting a wrong icon or application on the display unit.

SUMMARY

Disclosed herein is a method for optimizing arrangement of an icon on a display unit of a device. The method comprises determining a cumulative position score of each of plurality of grids on the display unit. The method further comprises determining a cumulative acquaintance score of the icon on the display unit. The method further comprises deriving a compatibility score between each of the plurality of grids and the icon based on the cumulative position score and the cumulative acquaintance score. The method further comprises optimizing the arrangement of the icon on the display unit based on the compatibility score.

In an aspect of the present disclosure, a device for optimizing arrangement of an icon on a display unit of the device is disclosed. The system comprises a processor and a memory communicatively coupled to the processor. The memory stores processor-executable instructions, which, on execution, cause the processor to determine a cumulative position score of each of plurality of grids on the display unit. The processor further configured to determine a cumulative acquaintance score of the icon on the display unit. The processor is further configured to derive a compatibility score between each of the plurality of grids and the icon based on the cumulative position score and the cumulative acquaintance score. The processor is further configured to optimize the arrangement of the icon on the display unit based on the compatibility score.

In another aspect of the present disclosure, a non-transitory computer readable medium for optimizing arrangement of an icon on a display unit of a device is disclosed. The non-transitory computer readable medium includes instructions stored thereon that when processed by a processor causes the device to perform operations comprising determining a cumulative position score of each of plurality of grids on the display unit. Then, a cumulative acquaintance score of the icon on the display unit is determined. A compatibility score between each of the plurality of grids and the icon is derived based on the cumulative position score and the cumulative acquaintance score. The arrangement of the icon on the display unit is optimized based on the compatibility score.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
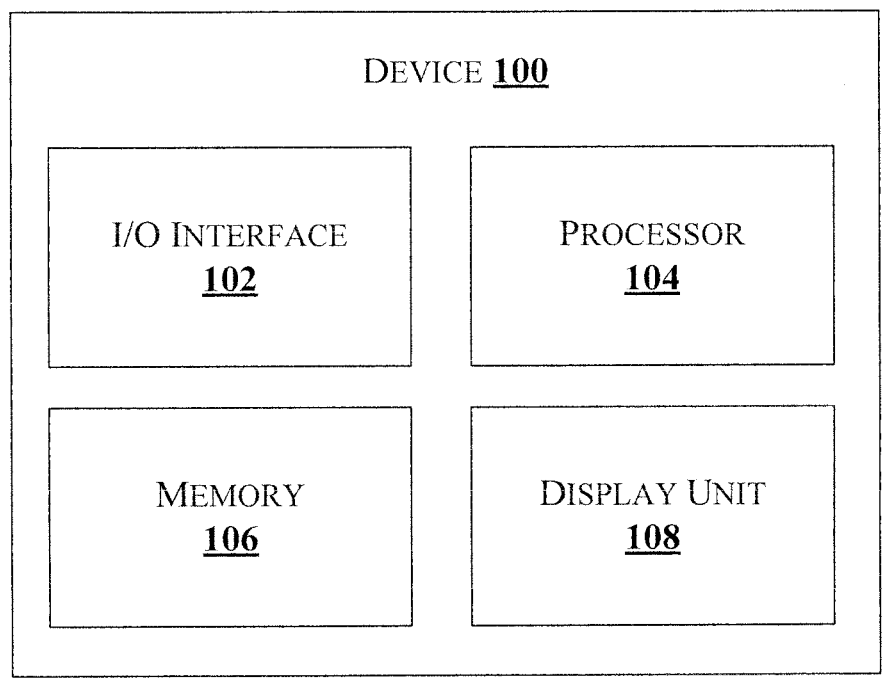
FIG. 1a illustrates a block diagram of a device with processor and memory in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure are related to a method and a device for optimizing arrangement of an icon on a display unit of the device. The device includes any such device which comprises one or more icons on one or more grids of the display unit of the device. The embodiments of the present disclosure initiates optimization of the arrangement of the icon upon receiving an event such as installing an application, change in position of the icon, deletion of the icon from user interface screen of the display unit, addition of the icon into the user interface screen, change of priority in placing the icon and/or change in background of an user interface screen. Upon detecting an occurrence of the event, the method determines cumulative position score of the one or more grids of the display unit and cumulative acquaintance score of the icon present on the display unit. The embodiments of the present disclosure use Red-Green-Blue (RGB) analysis and heat map analysis for determining the cumulative position score of the one or more grids. Additionally, muscle memory of a user is used along with heat map analysis. The embodiments of the present disclosure use RGB analysis of the icon and frequency with which the icon is used by the user to determine the cumulative acquaintance score of the icon. Based on convolution of the cumulative position score and the cumulative acquaintance score, a compatibility score is derived. The optimization of arranging the icon on the one or more grids is performed when the compatibility score between the cumulative position score and the cumulative acquaintance score is less.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a illustrates a block diagram of a device 100 with a processor 104 and a memory 106 in accordance with some embodiments of the present disclosure.

Examples of the device 100 includes, but is not limited to, mobiles phones, Personal Computers (PC), laptop, desktop computer, tablet, smartwatch, notebook, audio- and video-file players (e.g., MP3 players and iPODs), and e-book readers (e.g., Kindles and Nooks), smartphone, wearable device and the like. The device 100 refers to such device as well which comprises a touch screen having a touch screen panel. In an embodiment, the device 100 refers to such device having a touch pad.

The device 100 may include Input/Output (I/O) interface 102, at least one central processing unit ("CPU" or "processor") 104, a memory 106 and a display unit 108.

The I/O interface 102 is a medium through which an occurrence of at least one event is received. In an embodiment, a result of performing optimization of arranging the icon on the display unit 108 is provided to the display unit 108 through the I/O interface 102. In an embodiment, the I/O interface 102 is coupled with the processor 104.

The processor 104 may comprise at least one data processor for executing program components for executing user- or device-generated at least one event for optimizing the arrangement of the icon on the display unit 108. In an embodiment, the processor 104 initiates optimization of arranging the icon on the display unit 108 upon receiving the occurrence of the at least one event through the I/O interface 102. The processor 104 performs Red-Green-Blue (RGB) analysis and heat map analysis of each of the plurality of grids on the display unit 108. In an embodiment, the processor 104 determines a grid color score from the RGB analysis and a heat map score from the heat map analysis corresponding to each of the plurality of grids. The heat map score may be associated with muscle memory of the user. The heat map score is developed by frequent touch by the user on each of the plurality of grids. Each touch of the user may produce heat smudge on each of the plurality of grids. The heat smudge may get darker with increase in frequency of touch by the user. Certain position of each of the plurality of grids may appear darker on the heat map. The repeated frequent touch by the user may represent development of muscle memory by the user for each of the plurality of grids. The heat map score may be associated with each of the plurality of grids represents muscle memory developed by the user for each of the plurality of grids From the grid color score and the heat map score, the processor 104 evaluates a cumulative position score of each of the plurality of grids. In an embodiment, the processor 104 performs RGB analysis of the icon being added and/or deleted and/or present on the display unit 108 to determine icon color score. Further, the processor 104 evaluates frequency of usage of the icon present on the display unit 108. From the icon color score and the frequency of usage of the icon been evaluated, the processor 104 determines a cumulative acquaintance score of the icon on the display unit 108. In an embodiment, the processor 104 derives a compatibility score between each of the plurality of grids and the icon. The compatibility score is derived based on divergence between the cumulative position score and the cumulative acquaintance score. In an embodiment, comparison is performed with other icons present on the display unit 108 for deriving the compatibility score. Based upon the compatibility score and the comparison score of the other icons, the processor 104 decides the position of the icon on the plurality of grids on the display unit 108. Such a way of deciding the placement and position of the icon optimizes the arrangement of the icon on the display unit 108. In an embodiment, the processor 104 executes one or more modules for optimizing arrangement of the icon on the display unit 108 of the device 100 described in following description of the disclosure.

The memory 106 stores instructions which are executable by the at least one processor 104. The memory 106 stores grid data of each of the plurality of grids and icon data of each icon present on the display unit 108. The details contained in the grid data and the icon data are explained in following description. In an embodiment, the grid data and the icon data are stored as one or more data required for optimizing the arrangement of the icon on the display unit 108. The one or more data are described in the following description of the disclosure.

Figure 1B:
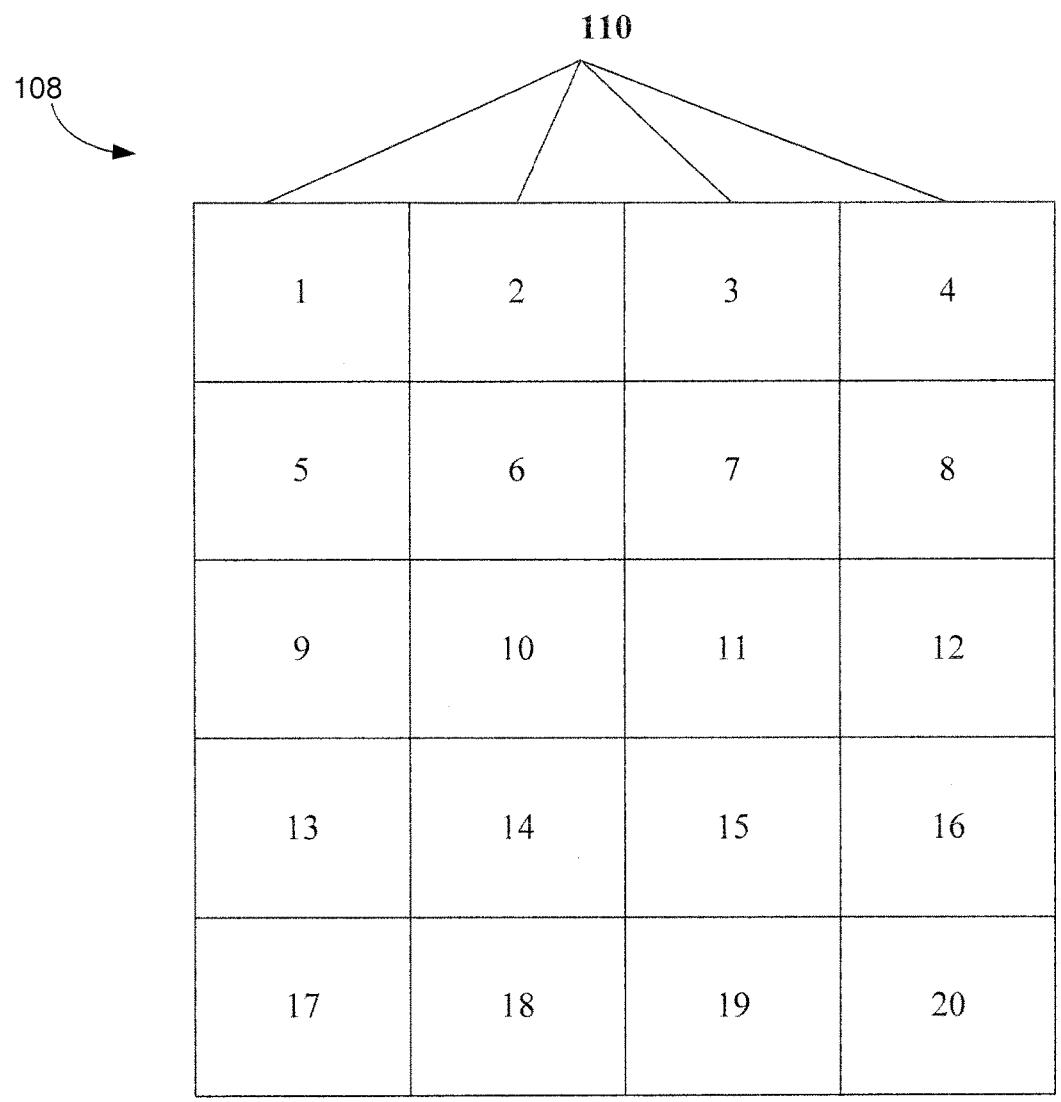
FIG. 1b illustrates an exemplary user interface screen of a display unit comprising plurality of grid positions in accordance with some embodiments of the present disclosure.
Figure 1C:
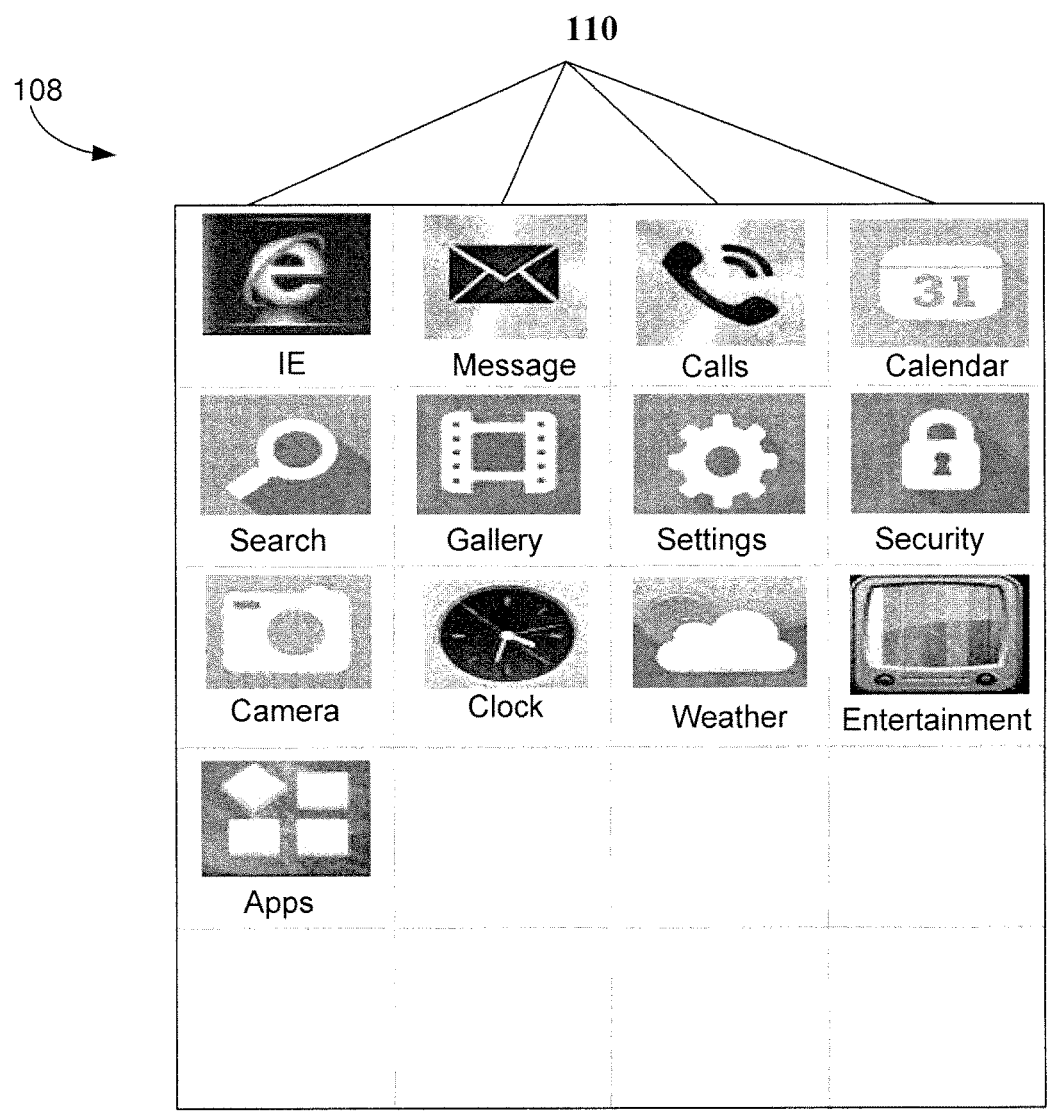
FIG. 1c illustrates an exemplary display unit comprising icons on the plurality of grid positions in accordance with some embodiments of the present disclosure.

The display unit 108 of the device 100 comprises one or more user interface screens which may be arranged one after the other horizontally and/or vertically on the display unit 108. In an embodiment, the one or more user interface screens may be Graphical User Interface (GUI). Each user interface screen of the one or more user interface screens is divided into the plurality of grids. Each grid of the plurality of grids is defined as a collection of pixels and is associated with a desired RGB color. Further, each grid defines a certain position on the corresponding user interface screen. The position of each of the plurality of grids is illustrated in FIG. 1*b*. In the illustrated FIG. 1*b*, consider a user interface screen of the one or more user interface screens is divided into 20 grids and/or positions collectively depicted by numeral 110. In an embodiment, the one or more user interface screens may comprise one or more icons placed or arranged on the position of each of the plurality of grids 110. The placement or arrangement of the one or more icons on the position of the plurality of grids 110 is shown in FIG. 1*c*. For example, in the illustrated FIG. 1*c*, the one or more icons include, but are not limited to, "Internet Explorer (IE)", "Message", "Calls", "Calendar", "Search", "Gallery", "Settings", "Security", "Camera", "Clock", "Weather", "Entertainment", and "Apps". Each icon comprises a size of the icon, color of the icon, type of the icon, symbol of the icon, and structure of the icon. In an embodiment, the display unit 108 manages the arrangement of the icon on the specific position of the plurality of grids 110 and displays the result of the optimization of arrangement of the icon.

Figure 2:
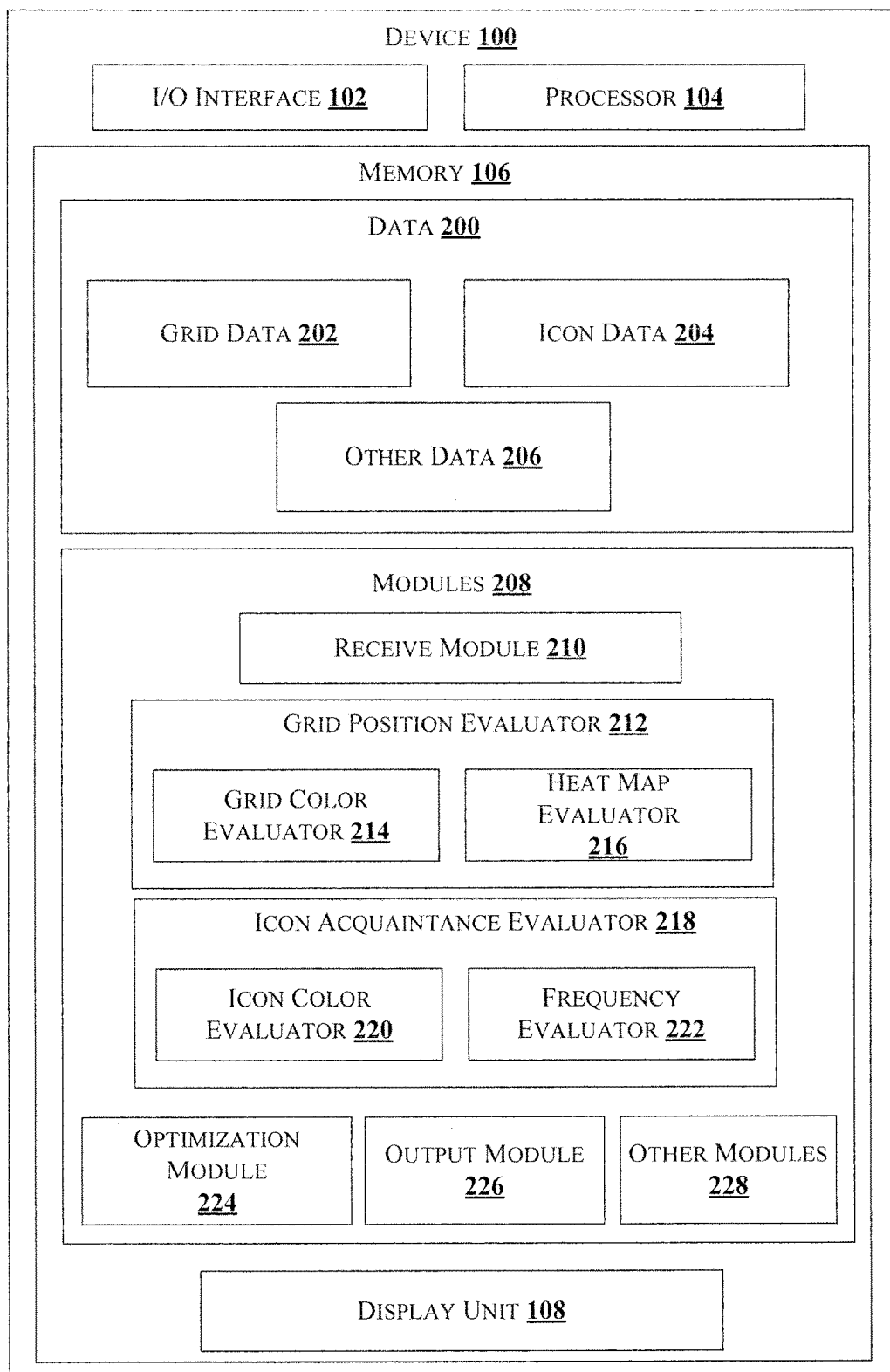
FIG. 2 illustrates a block diagram of an exemplary device with various data and modules for optimizing arrangement of an icon on a display unit of the device in accordance with some embodiments of the present disclosure.

FIG. 2 illustrates a block diagram of the exemplary device 100 with various data 200 and modules 208 for optimizing the arrangement of the icon on the display unit 108 of the device 100 in accordance with some embodiments of the present disclosure. In the illustrated FIG. 2, the one or more data 200 and the one or more modules 208 stored in the memory 106 are described herein in detail.

In an embodiment, the one or more data 200 may include, for example, the grid data 202, the icon data 204 and other 206 for optimizing the arrangement of the icon on the display unit 108 of the device 100.

The grid data 202 refers to the position of each of the plurality of grids on the one or more user interface screens, grid color data of each of the plurality of grids 110 and other details associated with each of the plurality of grids 110. The other details associated with each of the plurality of grid include, but are not limited to, RGB analysis data, hue and saturation analysis data, heat map data, graphics factor, familiarity factor and muscle memory data of each of the plurality of grids 110. In an embodiment, the graphics factor of each of the plurality of grids 110 defines the grid color data of each of the plurality of grids 110 which depends on the corresponding RGB analysis data and the corresponding hue and saturation analysis data. For example, graphics factor of the grid at the position 1 depends on the RGB analysis data and the hue and saturation analysis data corresponding to the grid at position 1. The familiarity factor of each of the plurality of grids 110 refers to amount of familiarity of the user with the position of each of the corresponding plurality of grids 110. Particularly, the familiarity factor refers to frequency with which the user touches certain position of each of the plurality of grids 110. For example, the familiarity factor of the grid at position 1 is evaluated if the user touches on the position 1 ten times a day. Such frequency of touching the position 1 ten times a day defines that the user is familiar with the grid at position 1. In an embodiment, the familiarity factor of each of the plurality of grids 110 depends on the heat map analysis data of the corresponding grid and the muscle memory data associated to the heat map analysis data. The familiarity factor may be mapped by the heat map analysis. Each touch of the user may produce heat smudge on each of the plurality of grids. The heat smudge may get darker with increase in frequency of touch by the user. Certain position of each of the plurality of grids may appear darker on the heat map. The familiarity factor of the each of the plurality of grids may be mapped by heat map analysis. The muscle memory data defines the familiarity factor which refers to how dynamically the user is familiar while touching the certain position of each of the corresponding plurality of grids 110. For example, the familiarity factor of the grid at position 1 depends on the heat map analysis data and the muscle memory data corresponding to the grid at position 1.

The icon data 204 refers to icon color data, data of frequency of usage of the icon, icon graphics factor, icon RGB analysis data, icon hue and saturation analysis data and icon familiarity factor of each of the plurality of grids 110. In an embodiment, the icon graphics factor defines the icon color data which depends on the corresponding icon RGB analysis data and the corresponding icon hue and saturation analysis data of the icon. For example, considering an application is installed and the application generates an icon "XX" on the user interface screen of the display unit 108. The icon graphics factor of the icon "XX" depends on the icon RGB analysis data and the icon hue and saturation analysis data of the icon "XX". The icon familiarity factor refers familiarity of the user with the usage of the icon. Particularly, the icon familiarity factor depends on the data of frequency of usage of the icon or number of clicks of the icon. For example, consider the icon "Entertainment". The icon familiarity factor of the icon "Entertainment" depends on the number of times the icon "Entertainment" is clicked or the frequency with which the icon "Entertainment" is used.

The other data 206 may refer to such data which can be preconfigured in the device 100 for optimizing the arrangement of the icon on the display unit 108 of the device 100.

In an embodiment, the one or more data 200 in the memory 106 are processed by the one or more modules 208 of the device 100. The one or more modules 208 may be stored within the memory 106 as shown in FIG. 2. In an example, the one or more modules 208, communicatively coupled to the processor 104, may also be present outside the memory 106. Particularly, the one or more data 200 in the memory 106 including the grid data 202 and the icon data 204 are used by the one or more modules 208. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 208 may include, for example, a receive module 210, a grid position evaluator 212, an icon acquaintance evaluator 218, an optimization module 224 and an output module 226. The memory 106 may also comprise other modules 228 to perform various miscellaneous functionalities of the device 100. It will be appreciated that such aforementioned modules may be represented as a single module or a combination of different modules.

In an embodiment, the receive module 210 receives a notification in relation to the occurrence of the at least one event associated with the display unit 108 through the I/O interface 102. The at least one event includes, but is not limited to, installing or downloading an application, deletion of the icon from the display unit 108, addition of the icon on the display unit 108, change in preference of placing or arranging the icon on a specific position on the display unit 108 and change in background screen i.e. user interface screen of the display unit 108. The installing or downloading an application comprises generation of an icon relating to the application on the user interface screen of the one or more user interface screens. The change in arrangement and/or position of the icon is explained with an example herein. For example, the icon "Entertainment" can be placed from position 12 to position 17 of the plurality of grids 110. The change in background screen is explained with an example herein. For example, change in wallpaper of the one or more user interface screens of the display unit 108.

The grid position evaluator 212 is configured to determine the cumulative position score of each of the plurality of grids 110 on the display unit 108. In an embodiment, the cumulative position score is determined based on the grid color score and the heat map score of each of the plurality of grids 110. In an embodiment, the grid position evaluator 212 comprises a grid color evaluator 214 and a heat map evaluator 216. The grid color evaluator 214 determines the grid color score of each of the plurality of grids 110 from the grid color data i.e. from the graphics factor of each of the plurality of grids 110. In one implementation, the grid color evaluator 214 performs RGB analysis and hue and saturation analysis to determine the graphics factor.

Figure 3A:
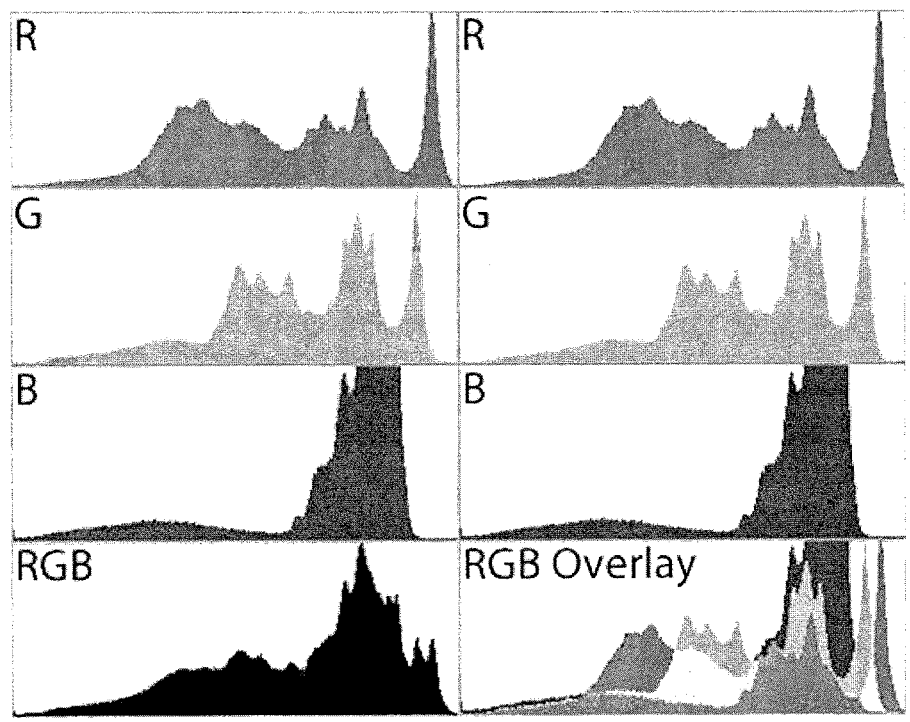
FIG. 3a illustrates exemplary Red-Green-Blue (RGB) analysis in accordance with some embodiments of the present disclosure.

The RGB analysis is defined by the three chromaticities of the red, green, and blue additive primaries. The RGB analysis can produce any chromaticity which is a triangle defined by the primary colors i.e. R-G-B colors. The RGB analysis also requires a white point chromaticity and a gamma correction curve. In an embodiment, a technique called histogram is used for RGB analysis. The histogram is a graphical representation of the number of pixels of the plurality of grids 110. FIG. 3*a* shows an exemplary RGB analysis of each of the plurality of grids 110. In embodiment, the RGB analysis uses a colour histogram technique. In an embodiment, the RGB analysis is performed using any other traditional method which can determine RGB of the plurality of grids.

The hue and saturation analysis of each of the plurality of grids 110 comprises Hue-Saturation-Lightness (HSI) and Hue-Saturation-Value (HSV) which are the two most common cylindrical-coordinate representations of points in RGB color model.

In an embodiment, from the convolution of the RGB analysis and the hue and saturation analysis of each of the plurality of grids 110, the graphics factor of each of the plurality of grids 110 is determined by the grid color evaluator 214. Thereupon, from the graphics factor, the grid color score of each of the plurality of grids 110 is evaluated.

Figure 3B:
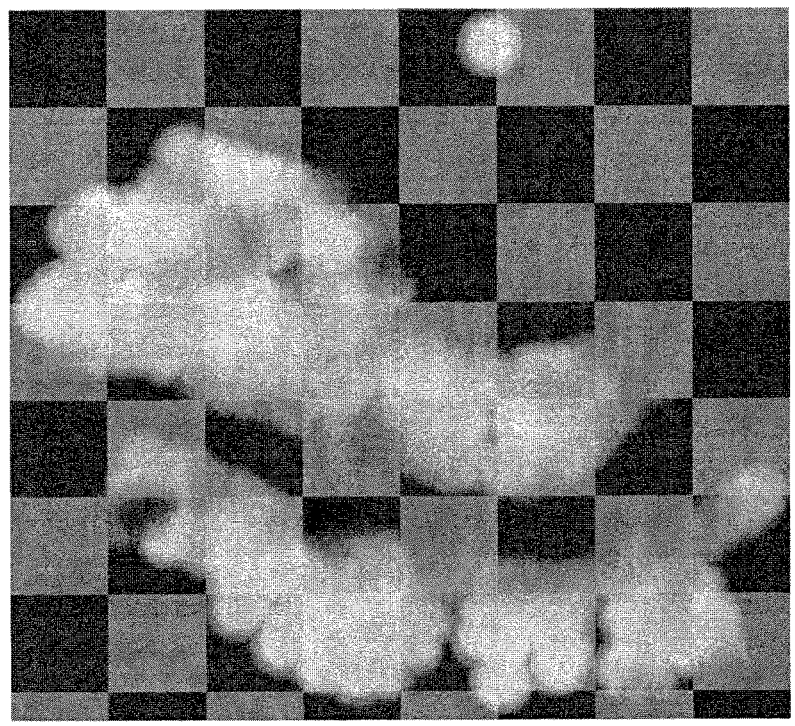
FIG. 3b shows an exemplary heat map analysis in accordance with some embodiments of the present disclosure.

The heat map evaluator 216 determines the heat map score of each of the plurality of grids 110. In an embodiment, the heat map score of each of the plurality of grids 110 is determined from the familiarity factor of each of the plurality of grids 110. The heat map evaluator 216 performs heat map analysis based on which the familiarity factor which determine the heat map score is determined. In an embodiment, the heat map analysis defines the touch of the user which produces heat smudge on each of the plurality of grids 110. FIG. 3*b* shows an exemplary diagram illustrating the heat map analysis of each of the plurality of grids 110. In an embodiment, the heat map score is associated with the muscle memory of the user on each of the plurality of grids 110. From the convolution of the heat map analysis and the muscle memory of the user, the familiarity factor i.e. heat map score of each of the plurality of grids 110 is evaluated by the heat map evaluator 216.

In an embodiment, the cumulative position score of each of the plurality of grids 110 is determined by the grid position evaluator 212 from the convolution of the graphics factor i.e. grid color score and the familiarity factor which determines the heat map score of each of the plurality of grids 110.

The icon acquaintance evaluator 218 determines the cumulative acquaintance score of the icon on the one or more user interface screens of the display unit 108. In an embodiment, the cumulative acquaintance score of the icon is determined based on icon color score and the frequency of usage of the icon. The icon acquaintance evaluator 218 comprises an icon color evaluator 220 and a frequency evaluator 222. The icon color evaluator uses the icon color data i.e. the icon graphics factor to determine the icon color score. In an embodiment, the icon color evaluator 220 performs icon RGB analysis and icon hue and saturation analysis to determine the icon graphics factor. In an embodiment, the icon graphics factor is determined from the convolution of the icon RGB analysis and the icon hue and saturation analysis. Thereupon, from the icon graphics factor, the icon color score is determined by the icon color evaluator 214.

The frequency evaluator 216 determines the frequency of usage of the icon. In an embodiment, the frequency of usage of the icon is determined using the data of frequency of usage of the icon i.e. from the icon familiarity factor.

In an embodiment, the cumulative acquaintance score of the icon is determined from the convolution of the icon graphics factor i.e. the icon color score and the frequency of usage of the icon i.e. the icon familiarity factor.

The optimization module 224 optimizes the arrangement of the icon on the one or more user interface screens of the display unit 108. In one implementation, the optimization module 224 derives the compatibility score of each of the plurality of grids and the icon based on the cumulative position score and the cumulative acquaintance score. In an embodiment, the compatibility score is derived based on the divergence between the cumulative position score and the cumulative acquaintance score. Additionally, the compatibility score is determined based on the comparison with other icon and other plurality of grids on the display unit 108. For example, consider the cumulative position score of the grid at position 1 is 30 and grid at position 2 is 40. Consider the cumulative acquaintance score of icon 'A' is 60. Now, the compatibility score i.e. divergence is a difference between the cumulative acquaintance score and the cumulative position score. Therefore, the compatibility score of grid at position 1 and the icon 'A' is 30 and the compatibility score of grid at position 2 and the icon 'A' is 20. Therefore, the placement or arrangement of the icon 'A' is optimized to be on grid at position 2 because the divergence between the grid at position 2 and the icon 'A' is less as compared to the divergence between the grid at position 1 and the icon 'A'. In an embodiment, all other icons on the one or more user interface screens are compared and accordingly arranged on the one or more user interface screens.

The other modules 228 processes all such operations required to optimize the arrangement of the icon on the one or more user interface screens of the display unit 108.

Figure 4:
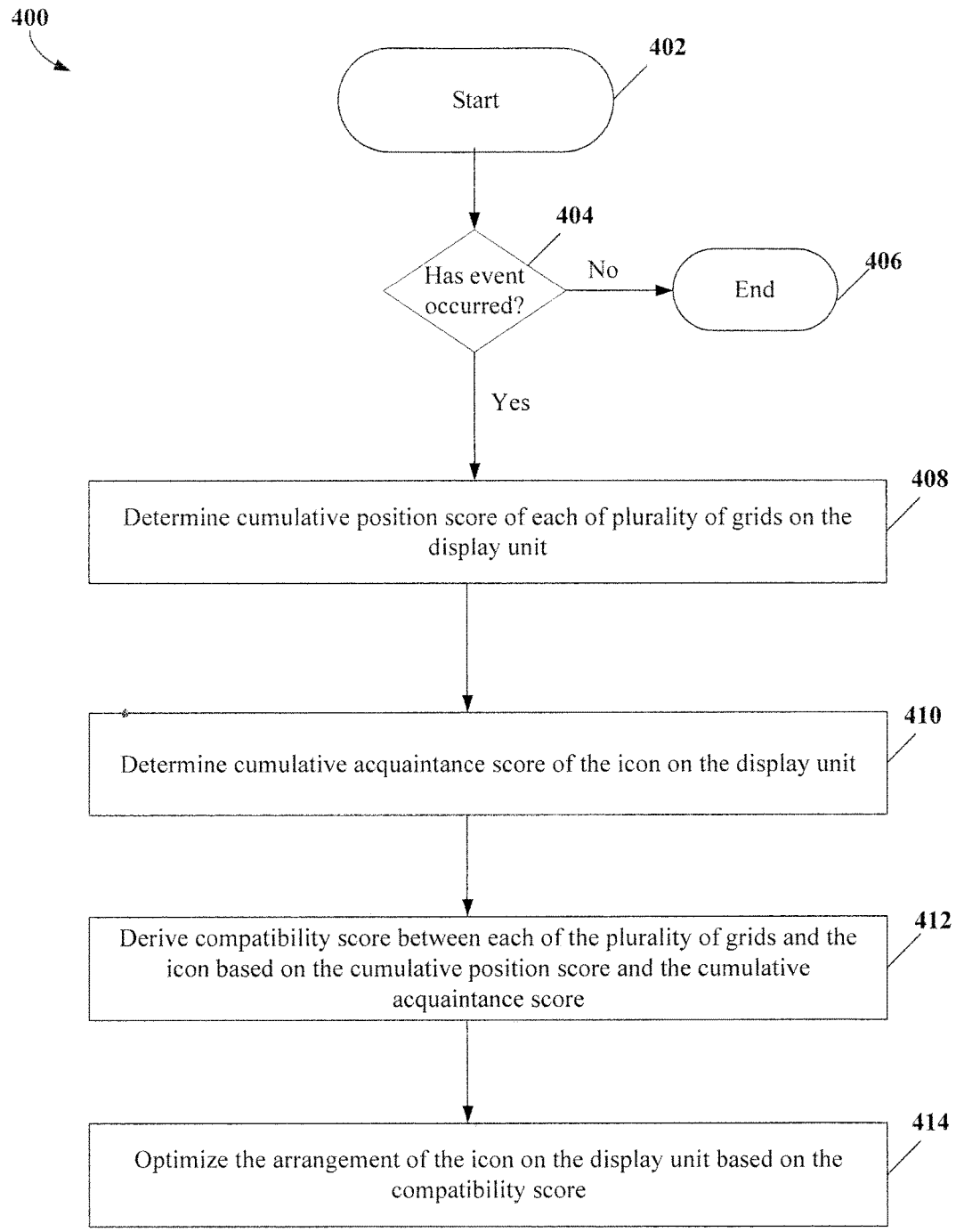
FIG. 4 shows a flowchart illustrating a method for optimizing arrangement of an icon on a display unit of a device in accordance with some embodiments of the present disclosure.

FIG. 4 shows a flowchart illustrating a method 400 for optimizing the arrangement of the icon on the display unit 108 of the device 100 in accordance with some embodiments of the present disclosure.

As illustrated in FIG. 4, the method comprises one or more blocks for optimizing the arrangement of the icon on the display unit 108 of the device 100. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 402, the process for optimizing the arrangement of the icon on the display unit 108 is started.

At block 404, the occurrence of the at least one event associated with the display unit 108 is determined. If the at least one event has not occurred, then the process for optimizing the arrangement of the icon is proceeded and the process is ended at block 406 via "No". If the occurrence of the at least one event is determined, then the process goes to block 408 via "Yes".

At block 408, the cumulative position score of each of the plurality of grids 110 on the display unit 108 is determined. In an embodiment, the cumulative position score is determined based on the grid color score and the heat map score associated with each of the plurality of grids 110. The grid color score is determined based on the RGB analysis for each of the plurality of grids 110 on the display unit 108. In an embodiment, the grid color score is determined on the hue and saturation analysis. Particularly, the grid color score is determined from the graphic factor of each of the plurality of grids 110 which is the convolution of the RGB analysis and the hue and saturation analysis. The heat map score is determined based on the heat map analysis of each of the plurality of grids 110 on the display unit 108. Particularly, the heat map score is determined from the familiarity factor of each of the plurality of grids 110. In an embodiment, the heat map score is associated with the muscle memory of the user.

At block 410, the cumulative acquaintance score of the icon on the display unit 108 is determined. The cumulative acquaintance score is determined based on the icon color score and the frequency of usage of the icon on the display unit 108. In an embodiment, the icon color score is determined from the icon graphics factor which is determined based on the icon RGB analysis and the icon hue and saturation analysis. The frequency of usage of the icon is determined from the icon familiarity factor.

At block 412, the compatibility score between each of the plurality of grids 110 and the icon is derived based on the cumulative position score and the cumulative acquaintance score. In an embodiment, the compatibility score between each of the plurality of grids 110 and the icon is derived based on the divergence between the cumulative acquaintance score and the cumulative position score.

At block 414, the arrangement of the icon is optimized on the display unit 108 based on the compatibility score.

Computer System

Figure 5:
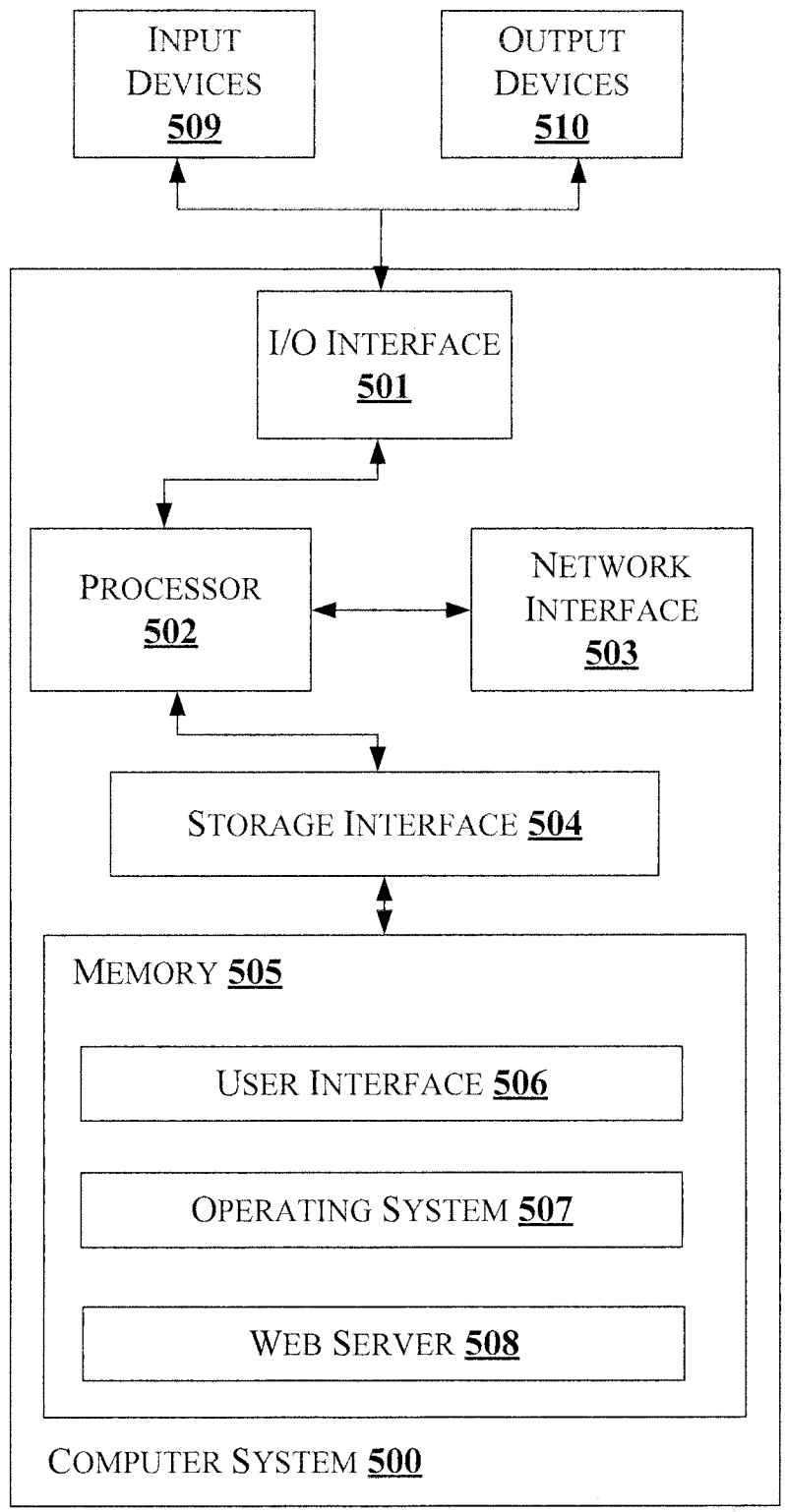
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the device 100. The computer system 500 optimizes the arrangement of the icon on the display unit 108 of the device 100. The computer system 500 may comprise a central processing unit ("CPU" or "processor") 502. The processor 502 may comprise at least one data processor for executing program components for executing user- or device-generated at least one event. A user may include a person, a person using a device such as those included in this disclosure, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (509 and 510) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices (509 and 510). For example, the input device 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface application 506, an operating system 507, web server 508 etc. In some embodiments, computer system 500 may store user/application data, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 506 may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, scrollers, windows, widgets, etc. Graphical 3 (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

The computer system 500 comprises a display unit (not shown in FIG. 5) comprising user interface screens having plurality of grid positions and one or more icons on the plurality of grid positions.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure provide an accurate method for arranging icons on appropriate position of the grids so that the user is familiar with the icons for usage. Further, the embodiments of the present disclosure enable the user to use cognitive skills to interact with the icon.

Embodiments of the present disclosure provide a method where user need not search for the icon in the entire user interface screen of the display unit. Further, the disturbances in the arrangement of the icon and the familiarity of the user with the icon are eliminated.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for optimizing icon arrangement, the method comprising:
   determining, by a computing device, a cumulative position score of each of a plurality of grids on a display unit based on at least a grid familiarity factor for each of the plurality of grids comprising a frequency of touching each of the plurality of grids during a period of time;
   determining, by the computing device, a cumulative acquaintance score of an icon on the display unit based on at least an icon familiarity factor for the icon comprising at least one of a frequency of usage of the icon or a number of recorded clicks of the icon during the period of time;
   deriving, by the computing device, a compatibility score between each of the grids and the icon based on a difference between each of the cumulative position scores and the cumulative acquaintance score; and
   optimizing, by the computing device, an arrangement of the icon into one of the grids on the display unit having a lowest one of the compatibility scores between each of the grids and the icon.

2. The method as claimed in claim 1, wherein the arrangement of the icon is optimized upon receiving an occurrence of at least one event associated with the display unit.

3. The method as claimed in claim 1, wherein the determining the cumulative position score of each of a plurality of grids is further based on a convolution of a grid color score and the grid familiarity factor for each of the plurality of grids.

4. The method as claimed in claim 3, wherein the grid color score is determined based on a Red-Green-Blue (RGB) analysis for, or a heat map analysis of, each of the grids on the display unit.

5. The method as claimed in claim 3, wherein the heat map score is associated with muscle memory of a user developed over a period of time based on a frequency of touching a grid on the display unit.

6. The method as claimed in claim 1, wherein the determining the cumulative acquaintance score is further based on a convolution of an icon color score and the icon familiarity factor for the icon.

7. The method as claimed in claim 6, wherein the icon color score is determined based on a Red-Green-Blue (RGB) analysis of the icon.

8. A computing device, comprising at least one processor and a memory coupled to the processor which is configured to be capable of executing programmed instructions comprising and stored in the memory to:

determine a cumulative position score of each of a plurality of grids on a display unit based on at least a grid familiarity factor for each of the plurality of grids comprising a frequency each of the plurality of grids is touched during a period of time;

determine a cumulative acquaintance score of an icon on the display unit based on at least an icon familiarity factor for the icon comprising at least one of frequency of usage of the icon or a number of record clicks of the icon during the period of time;

derive a compatibility score between each of the grids and the icon based on a difference between each of the cumulative position scores and the cumulative acquaintance score; and optimize an arrangement of the icon into one of the grids on the display unit having a lowest one of the compatibility scores between each of the grids and the icon.

9. The computing device as claimed in claim 8, wherein the arrangement of the icon is optimized upon receiving an occurrence of at least one event associated with the display unit.

10. The computing device as claimed in claim 8, wherein the determine the cumulative position score of each of a plurality of grids is further based on a convolution of a grid color score and the grid familiarity factor for each of the plurality of grids.

11. The computing device as claimed in claim 10, wherein the grid color score is determined based on a Red-Green-Blue (RGB) analysis for, or a heat map analysis of, each of the grids on the display unit.

12. The computing device as claimed in claim 10, wherein the heat map score is associated with muscle memory of a user developed over a period of time based on a frequency of touching a grid on the display unit.

13. The computing device as claimed in claim 8, wherein the determine the cumulative acquaintance score is further based on a convolution of an icon color score and the icon familiarity factor for the icon.

14. The computing device as claimed in claim 13, wherein the icon color score is determined based on a Red-Green-Blue (RGB) analysis of the icon.

15. A non-transitory computer readable medium having stored thereon instructions for optimizing icon arrangement comprising executable code which when executed by a processor, causes the processor to perform steps comprising:

determining a cumulative position score of each of a plurality of grids on a display unit based on at least a grid familiarity factor for each of the plurality of grids comprising a frequency each of the plurality of grids is touched during a period of time;

determining a cumulative acquaintance score of an icon on the display unit based on at least an icon familiarity factor for the icon comprising at least one of frequency of usage of the icon or a number of record clicks of the icon during the period of time;

deriving a compatibility score between each of the grids and the icon based on a difference between each of the cumulative position scores and the cumulative acquaintance score; and optimizing an arrangement of the icon into one of the grids on the display unit having a lowest one of the compatibility scores between each of the grids and the icon.

16. The non-transitory computer readable medium as claimed in claim 15, wherein the arrangement of the icon is optimized upon receiving an occurrence of at least one event associated with the display unit.

17. The non-transitory computer readable medium as claimed in claim 15, wherein the determining the cumulative position score of each of a plurality of grids is further based on a convolution of a grid color score and the grid familiarity factor for each of the plurality of grids.

18. The non-transitory computer readable medium as claimed in claim 17, wherein the grid color score is determined based on a Red-Green-Blue (RGB) analysis for, or a heat map analysis of, each of the grids on the display unit.

19. The non-transitory computer readable medium as claimed in claim 17, wherein the heat map score is associated with muscle memory of a user developed over a period of time based on a frequency of touching a grid on the display unit.

20. The non-transitory computer readable medium as claimed in claim 17, wherein the determining the cumulative acquaintance score is further based on a convolution of an icon color score and the icon familiarity factor for the icon.

21. The non-transitory computer readable medium as claimed in claim 20, wherein the icon color score is determined based on a Red-Green-Blue (RGB) analysis of the icon.

* * * * *